United States Patent
Coleman

(10) Patent No.: US 9,989,352 B2
(45) Date of Patent: Jun. 5, 2018

(54) PLAYING SURFACE COLLISION DETECTION SYSTEM

(71) Applicant: Chuck Coleman, Danville, CA (US)

(72) Inventor: Chuck Coleman, Danville, CA (US)

( * ) Notice: Subject to any disclaimer, the term of this patent is extended or adjusted under 35 U.S.C. 154(b) by 188 days.

(21) Appl. No.: 14/664,698

(22) Filed: Mar. 20, 2015

(65) Prior Publication Data

US 2016/0271446 A1 Sep. 22, 2016

(51) Int. Cl.
| | |
|---|---|
| *A63F 9/24* | (2006.01) |
| *G01B 11/00* | (2006.01) |
| *A63B 69/36* | (2006.01) |
| *A63B 69/38* | (2006.01) |
| *G09B 19/00* | (2006.01) |
| *G06K 9/28* | (2006.01) |
| *H04M 1/725* | (2006.01) |

(52) U.S. Cl.
CPC ............ *G01B 11/002* (2013.01); *A63B 69/36* (2013.01); *A63B 69/38* (2013.01); *G06K 9/28* (2013.01); *G09B 19/0038* (2013.01); *H04M 1/7253* (2013.01)

(58) Field of Classification Search
CPC ..... A63B 24/0021; A63B 69/36; A63B 69/38; G01B 11/002
See application file for complete search history.

(56) References Cited

U.S. PATENT DOCUMENTS

| | | | | |
|---|---|---|---|---|
| 3,415,517 A | * | 12/1968 | Krist ................ | A63B 71/0605 273/372 |
| 3,774,194 A | * | 11/1973 | Jokay ............... | A63B 71/0605 340/323 R |
| 3,810,148 A | * | 5/1974 | Karsten ............ | A63B 71/0605 250/221 |
| 4,004,805 A | * | 1/1977 | Chen ................ | A63B 71/0605 250/221 |
| 4,422,647 A | * | 12/1983 | Wilson .............. | A63B 71/0605 340/323 R |
| 4,528,548 A | * | 7/1985 | Oberan .............. | A63B 63/00 340/323 R |
| 4,770,527 A | * | 9/1988 | Park .................. | A63B 63/00 250/222.1 |
| 5,059,944 A | * | 10/1991 | Carmona ........... | A63B 71/0605 340/323 R |
| 5,138,322 A | * | 8/1992 | Nuttall .............. | A63B 71/0605 342/126 |
| 2004/0185952 A1 | * | 9/2004 | Marshall ........... | A63B 71/0605 473/151 |

* cited by examiner

*Primary Examiner* — Steve Rowland
(74) *Attorney, Agent, or Firm* — West & Associates, A PC; Stuart J. West

(57) ABSTRACT

A collision detection system configured to determine when a ball or other object impacts against a playing surface, record the location of the object's impact, and compare the object's impact location against one or more preset virtual target areas to determine whether or not the object was successfully hit into a desired area of the playing surface and immediately reward the player with various types of audible and/or visual responses for hitting the target.

16 Claims, 17 Drawing Sheets

PLAYING SURFACE COLLISION DETECTION SYSTEM

BACKGROUND

Field of the Invention

The present disclosure relates to tracking sport ball positions, particularly a system for tracking a ball's position and/or detecting when the ball hits a virtual target area on a playing surface.

Background

In most sports the position of a ball on or above the court, field, or other playing surface is important. The ball's position often dictates whether an opponent scores points, or dictates tactics that should be used be one or more opponents. For example, in tennis when one player hits the tennis ball to a far side of the court near a side line, the other opponent may need to move out of his or her desired position to return the ball and end up leaving most of the court open behind him/her.

When a player practices a sport and attempts to hit, throw, kick, or otherwise move a ball to a desired location on the playing surface, traditionally the player or a coach must visually determine whether or not the ball hit the desired location on the playing surface. In some fast-paced sports, determining where the ball hits the playing surface can be difficult, because in some cases the ball moves, hits the playing surface, bounces, and moves to another location faster than the human eye can process. When practicing, it can also be desired to keep a log of where the ball hits on the playing surface over multiple attempts. Traditionally, a player or coach would have to remember where the ball hit each time, record each hit manually on a chart, or capture the practice session on video so that the video can be reviewed to determine the location of each hit. This process can be time-consuming and/or labor intensive.

What is needed is a system that can determine when a ball or other object impacts a playing surface, and can record the location of the impact on the playing surface. The system should also determine whether a ball's impact against the playing surface was within one or more preset virtual target areas on the playing surface, and record information about successfully hit target areas.

DETAILED DESCRIPTION

Figure 1A:
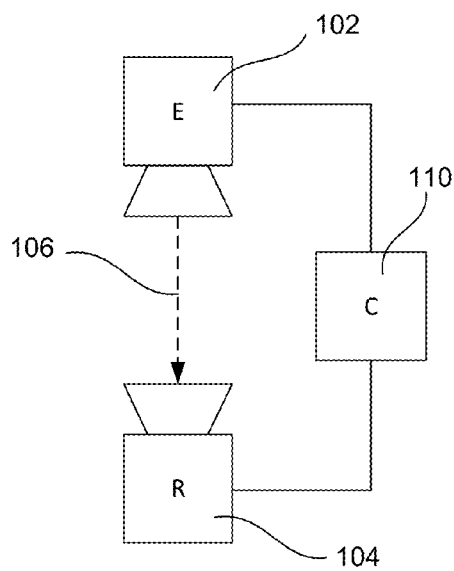
FIG. 1A depicts a top view of an emitter/receiver pair in a collision detection system.

FIG. 1A depicts a top view of a collision detection system 100. In some embodiments, a collision detection system 100 can comprise one or more pairs of emitters 102 and receivers 104. Each emitter 102 can be configured to emit a beam of light. In some embodiments, the emitter 102 can emit light within the non-visible spectrum. By way of a non-limiting example, an emitter 102 can be an infrared light-emitting diode (ILED) configured to emit a beam of infrared light. In alternate embodiments, the emitter 102 can emit visible light. Each receiver 104 can be configured to detect the type of light emitted by the emitters 102. By way of a non-limiting example, when the emitter 102 emits infrared light, a corresponding receiver 104 can comprise a phototransistor configured to detect infrared light.

The components of a collision detection system 100 can be set up and positioned such that each emitter 102 emits a beam 106 of light toward a different receiver 104. As shown in FIG. 1A, the emitter 102 can be pointed such that the beam 106 it emits is pointed toward the receiver 104 such that the receiver 104 can detect the receipt of the beam 106.

The receiver 104 can also be configured to determine if and when an expected beam 106 is not received from an emitter 102. By way of a non-limiting example, a receiver 104 comprising an infrared phototransistor can have a circuit that allows current to flow when the phototransistor is exposed to infrared light by the beam 106, and that stops the flow of current when the phototransistor is not detecting infrared light. In this example, the receiver 104 can determine that the beam 106 has been broken when current does not flow in the receiver's infrared-detection circuit.

Figure 1B:
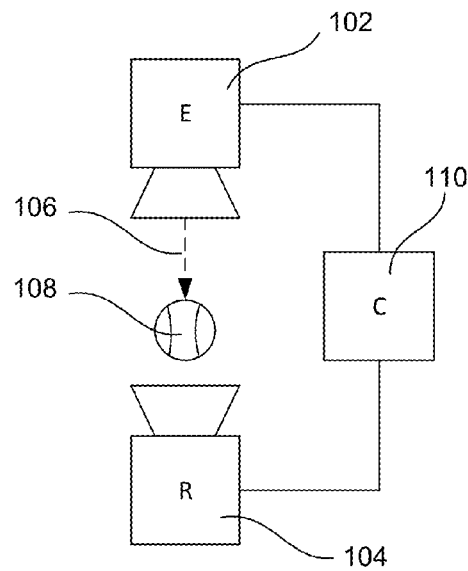
FIG. 1B depicts the collision detection system of FIG. 1A detecting an object.

A beam 106 can be broken when an object 108 comes between the emitter 102 and the receiver 104, such that the beam 106 terminates at the object 108 instead of continuing toward the receiver 104. By way of a non-limiting example, FIG. 1B depicts a situation in which a beam 106 is broken by an object 108 such as a ball, and the beam 106 does not continue past the object 108 to the receiver 104.

The emitters 102 and receivers 104 can be in data communication with a controller 110 through a wired or wireless connection. By way of non-limiting examples, the emitter and receivers can communicate with the controller 110 via a wired connection, a Wi-Fi connection, a Bluetooth connection, an RF connection, or any other type of connection. The controller 110 can be a computer, mobile device, or other device configured to control the emitters 102 and receivers 104 and/or process information received from the emitters 102 and/or receivers 104.

The controller 110 can instruct any or all of the emitters 102 to emit a beam 106 and instruct corresponding receivers 104 to expect to receive a beam 106 from their paired emitters 102. When any receiver 104 detects that the beam 106 it expected was broken and was not received, the receiver 104 can report to the controller 110 that the beam 106 was broken. By way of a non-limiting example, when an object 108 comes between an emitter 102 and receiver 104 and thereby breaks a beam 106, as shown in FIG. 1B, the receiver 104 can report to the controller 110 that the beam 106 it expected to receive was broken.

Figure 2:
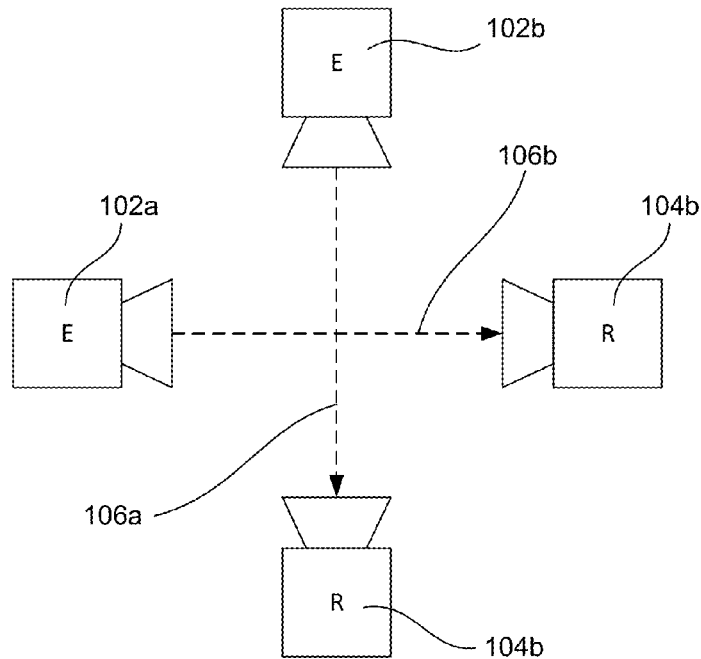
FIG. 2 depicts a top view of two emitter/receiver pairs in a collision detection system set up to have orthogonal beams.

In some embodiments, a collision detection system 100 can comprise more than one emitter/receiver pair. When more than one pair is present in a collision detection system 100, the emitter/receiver pairs can be arranged such that the beams 106 extending between each pair's emitter 102 and receiver 104 are parallel, orthogonal, and/or have any other arrangement. In some embodiments, beams 106 extending between different emitter/receiver pairs can cross. By way of a non-limiting example, FIG. 2 shows an arrangement of emitter/detector pairs in which beam 106a extending from emitter 102a to receiver 104b is orthogonal to beam 106b extending from emitter 102b to receiver 104b, such that beam 106a crosses beam 106b. In this example, receiver 104a can report to the controller 110 when beam 106a is broken by an object 108, and receiver 104b can report to the controller 110 when beam 106b is broken by an object 108. As such, if both receivers 104 report to the controller 110 at the same time that the beams 106 they expected were broken, the controller 110 can use that information to determine that the object 108 was located at the point where beams 106a and 106b initially crossed, because both beams 106 were broken at the same time.

Figure 3A:
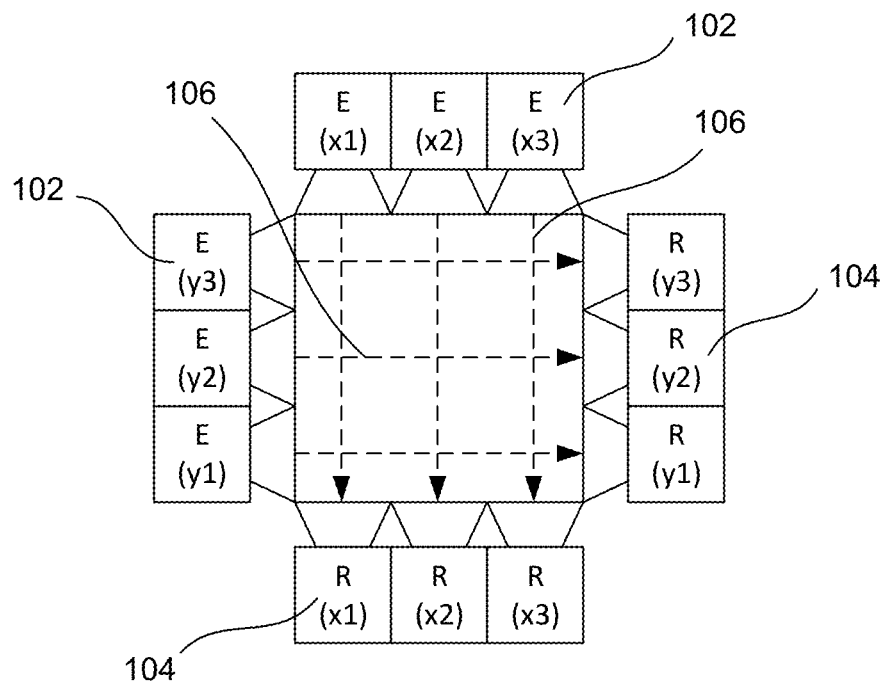
FIG. 3A depicts a top view of a collision detection system forming a grid of beams.
Figure 3B:
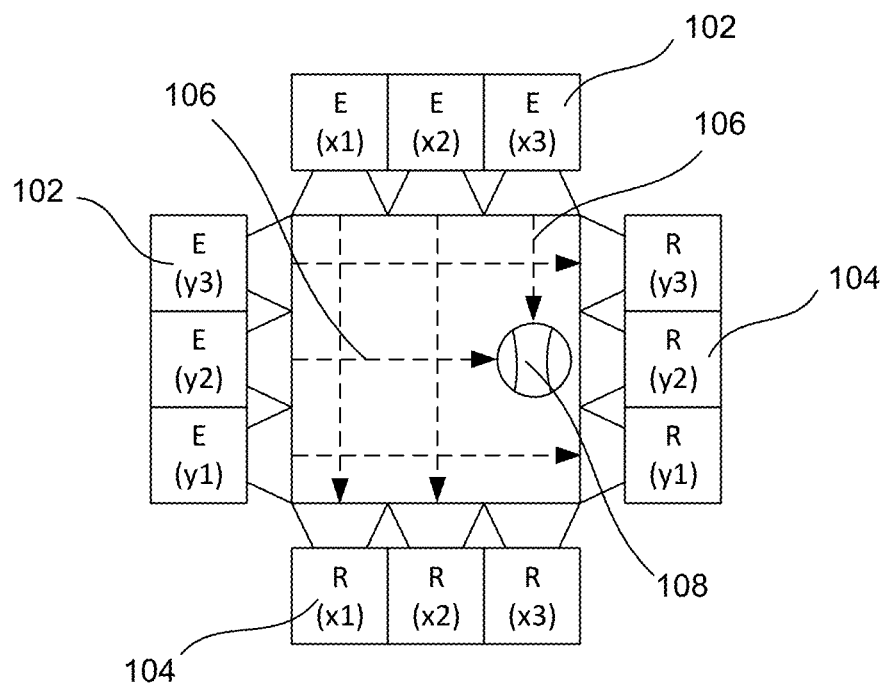
FIG. 3B depicts the collision detection system of FIG. 3A detecting an object.

FIGS. 3A and 3B depict a non-limiting example in which a first set of emitter/receiver pairs are positioned orthogonally to a second set of emitter/receiver pairs to form a grid of beams 106. By positioning emitters 102 and receivers 104 to form a grid of beams 106, the controller 110 can determine the coordinates, such as Cartesian x and y coordinates, of the location of an object 108 that breaks beams 106 anywhere within the grid of beams 106. By way of a non-limiting example, each pair within the first set of emitter/receiver pairs can correspond to x coordinates within the grid and each pair within the second set of emitter/receiver pairs can correspond to y coordinates within the grid. In the example of FIG. 3A, the collision detection system 100 has been set up to form a 3×3 grid. When an object 108 breaks a set of orthogonal beams 106, the receivers 104 that fail to receive their expected beams 106 can report that information to the controller 110, and the controller 110 can determine the coordinates of the object 108 on the grid at that point in time. By way of a non-limiting example, in the example of FIG. 3B an object 108 breaks a beam 106 corresponding to x=3 and a beam 106 corresponding to y=2, and the controller 110 can therefore determine that the object 108 is currently at location (3, 2) on the grid formed by the beams 106.

Pairs of emitters 102 and receivers 104 can be positioned around at least a portion of a playing surface 112, such as a sport court, field, course, or any other surface. The placement of the emitter/receiver pairs can allow activation of any or all of the emitter/receiver pairs to form a grid of beams 106 over some or all of the playing surface 112.

Figure 4A:
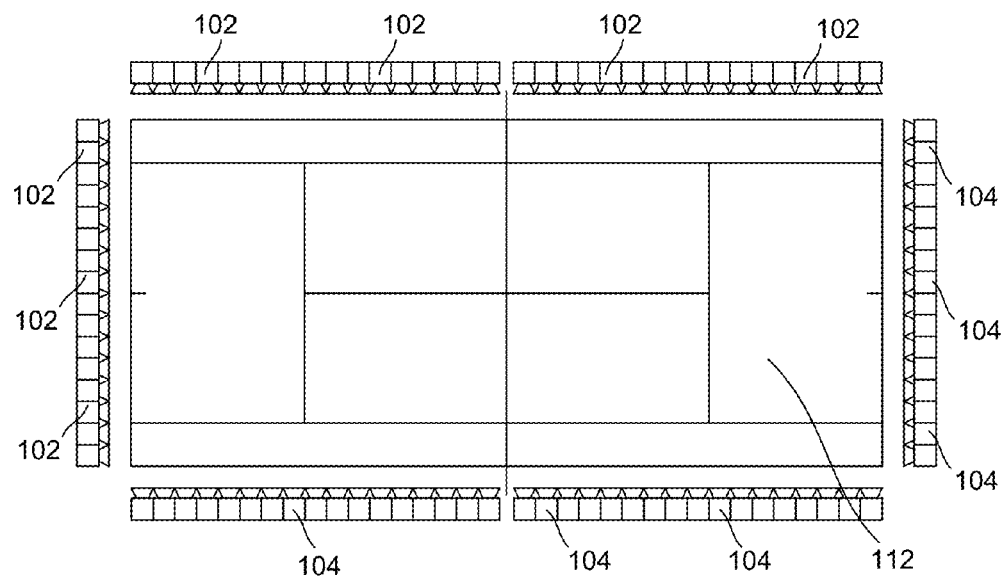
FIG. 4A depicts a top view of emitters and receivers in a collision detection system set up around a full tennis court.
Figure 4B:
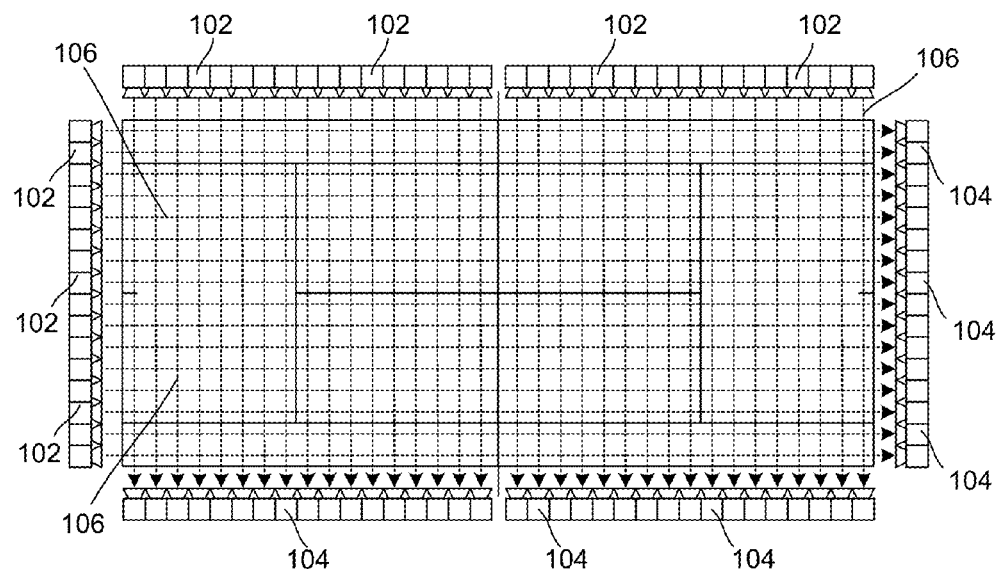
FIG. 4B depicts a grid of beams formed by the collision detection system of FIG. 4A.

By way of a non-limiting example, FIG. 4A depicts sets of paired emitters 102 and receivers 104 positioned orthogonally around an entire tennis court, such that a grid of beams 106 can be formed over any or all of the tennis court as shown in FIG. 4B. In this example, some beams 106 can extend along the length of the tennis court underneath the tennis court's net.

Figure 5A:
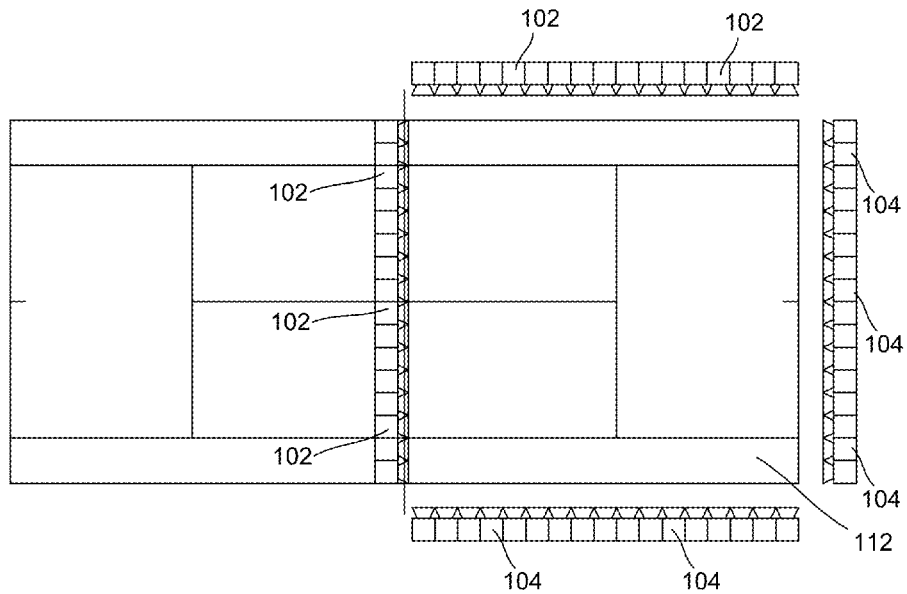
FIG. 5A depicts a top view of emitters and receivers in a collision detection system set up around half a tennis court.
Figure 5B:
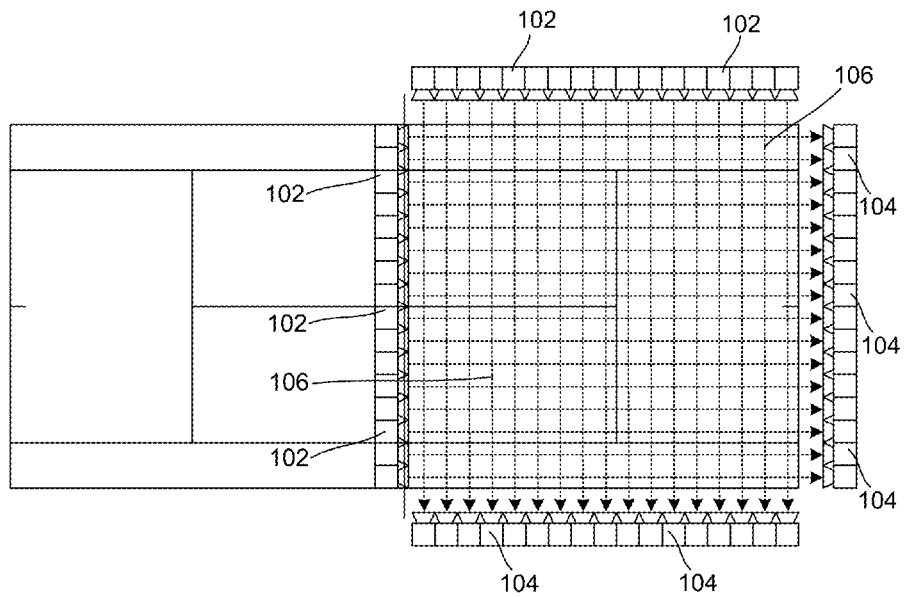
FIG. 5B depicts a grid of beams formed by the collision detection system of FIG. 5A.

By way of another non-limiting example, FIG. 5A depicts sets of paired emitters 102 and receivers 104 positioned orthogonally around a half of a tennis court, such that a grid of beams 106 can be formed over any or all of the half tennis court as shown in FIG. 5B. In this example, one series of emitters 102 can be positioned substantially underneath the tennis court's net, such that the grid can cover all or almost all of the right half of the tennis court.

Figure 6A:
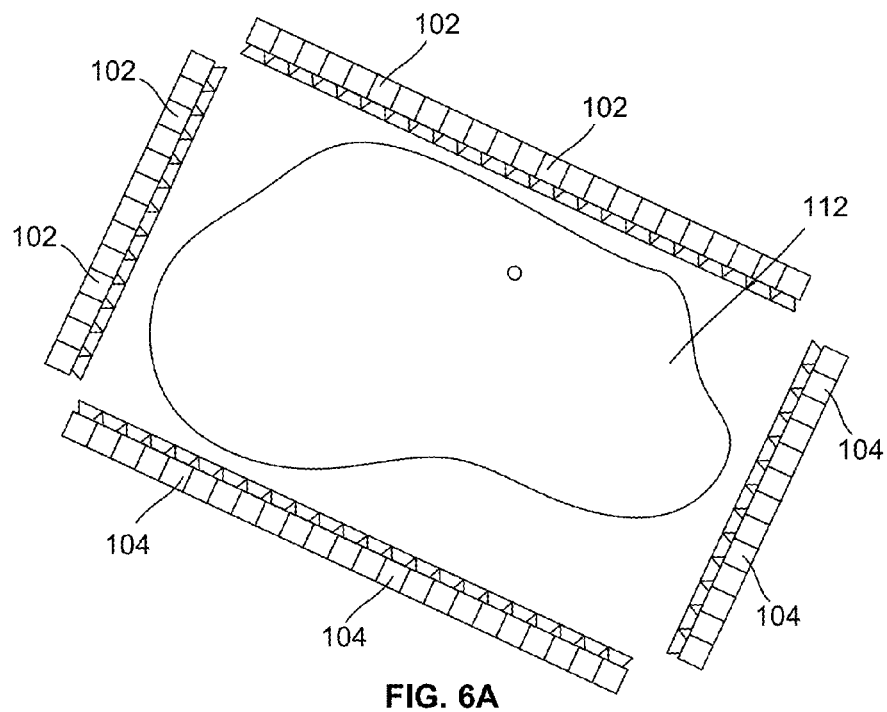
FIG. 6A depicts a top view of emitters and receivers in a collision detection system set up around a golf practice green.
Figure 6B:
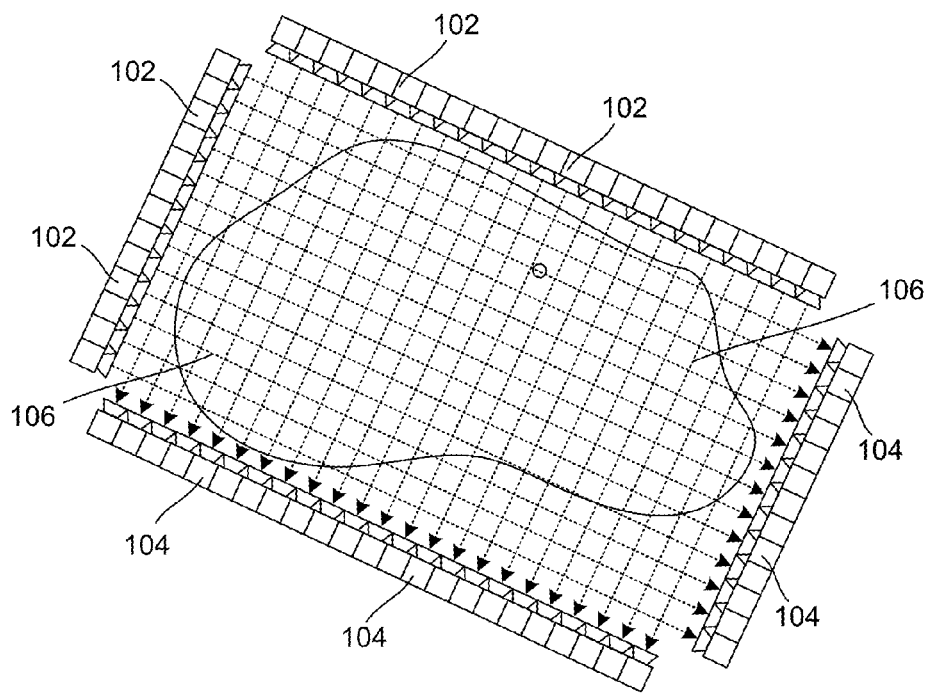
FIG. 6B depicts a grid of beams formed by the collision detection system of FIG. 6A.

By way of yet another non-limiting example, FIG. 6A depicts sets of paired emitters 102 and receivers 104 positioned orthogonally around a practice golf green, which can form a grid of beams 106 over the practice green as shown in FIG. 6B. In this example, the practice green can be a substantially flat practice green found at many driving ranges or golf courses, such that the beams 106 can be positioned at a height that will extend over the practice green but still be low enough to the ground to detect a golf ball with a diameter of approximately 1.68 inches when the golf ball hits the surface of the green. Similar arrangements of emitters 102 and receivers 104 can be set up to form grids of beams 106 over partial or full soccer fields, baseball fields, basketball courts, volleyball courts, or any other type of playing surface 112 for which detection of an object 108 colliding with the playing surface 112 is desired.

In some embodiments the emitters 102 and receivers 104 can be placed such that the beams 106 span the playing surface 112 at a height at which an object 108 desired to be detected would break the beams 106 when the object contacts the playing surface 112. In some embodiments the height of the beams 106 can be selected as being between as low as possible to the playing surface 112 itself and the maximum height of the object 108 to be detected. By way of a non-limiting example, when the collision detection system 100 is installed around a tennis court and the object 108 to be detected is a tennis ball with a 2.7 inch diameter, the emitters 102 and receivers 104 can be positioned such that the beams 106 extend over the playing surface 112 at a height ranging between 0.1 and 2.7 inches, such that a tennis ball that hits the playing surface 112 would break the beams 106.

In alternate embodiments the emitters 102 and receivers 104 can be placed such that the beams 106 span the playing surface 112 at a height greater than the height of the object 108, such that an object 108 to be detected would break the beams 106 when just above the playing surface 112 but would not break the beams 106 when the object 108 is resting on the playing surface 112. By way of a non-limiting example when the target object 108 is a tennis ball with a 2.7 inch diameter, the emitters 102 and receivers 104 can be positioned such that the beams 106 extend over the playing surface 112 at a height of 3 or 4 inches, such that the tennis ball would break the beam 106 when flying toward the playing surface 112 pre-bounce or away from the playing surface 112 post-bounce, but leave the beams 106 intact when rolling or resting on the playing surface 112 underneath the beams 106. In these embodiments the location of the ball's impact on the playing surface 112 can still be detected with sufficient accuracy based on the position of the broken beams 106 pre-bounce and/or post-bounce.

The emitters 102 and receivers 104 can also be placed such that the space between parallel beams is less than the width of the object 108 expected to be detected, such that at least one parallel beam 106 would be broken when the object 108 hits the playing surface 112 or passes through the plane of the beams. By way of a non-limiting example, if the object to be detected is a tennis ball with a 2.7 inch diameter, the emitters 102 and receivers 104 can be positioned such that parallel beams 106 are less than 2.7 inches apart, such that a tennis ball passing through the plane of the beams 106 would break at least one parallel beam 106. If two parallel beams 106 are broken, two receivers 104 can report that their beams 106 were broken to the controller 110, and the controller 110 can determine that the object 108 impacted the playing surface 112 at a location between the coordinates associated with the two receivers 104.

Some or all of the beam 106 in a grid can be set up to monitor one or more target areas 700 for impacts of an object 108 against the playing surface 112. Target areas 700 can be virtual areas on or above the playing surface 112. In some embodiments, all of the beams 106 in a grid can be turned on over a playing surface 112, and the controller 110 can compare the coordinates of a detected collision with coordinates defining a target area 700 to determine if the collision was within the target area 700.

Figure 7:
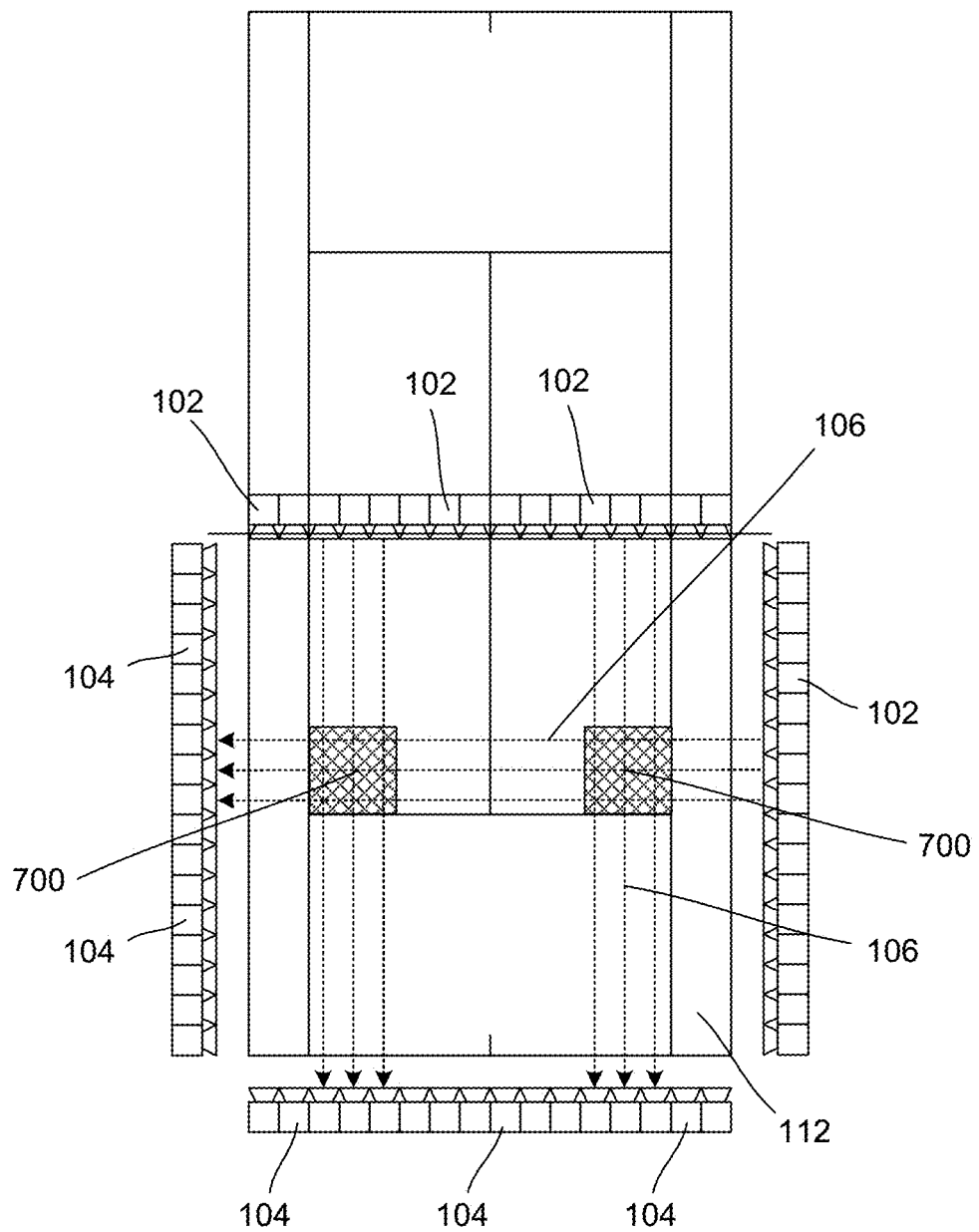
FIG. 7 depicts intersecting beams forming target areas.

In other embodiments, a subset of the beams 106 that define the target areas 700 can be turned on or be monitored while the rest of the beams 106 are turned off or are not monitored for collisions, such that the controller 110 can determine that a collision was within a target area 700 if any of the beams 106 that were turned on to define the target area 700 were broken. By way of a non-limiting example, in FIG. 7 two columns of beams 106 extending from the net of a tennis court to behind the court and a row of beams 106 extending from one side of the court to the other are monitored, such that the intersections of those columns and the row form two target areas 700 at different locations on the court.

Figure 8:
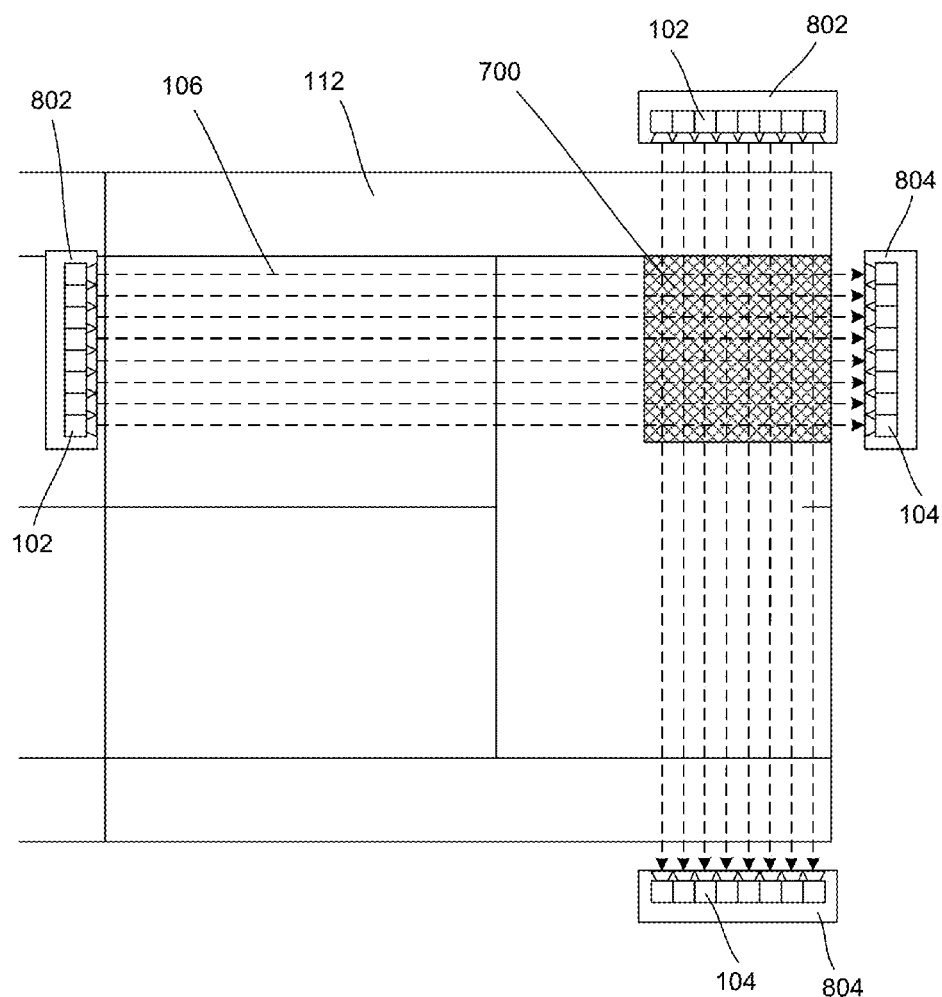
FIG. 8 depicts an alternate embodiment of the system shown in FIG. 4A thru FIG. 7

In still other embodiments, a set of emitters 102 can be mounted on an emitter assembly 802, and a set of receivers 104 can be mounted on a receiver assembly 804, as shown in FIG. 8. Each emitter assembly 802 and receiver assembly 804 can be a box, board, base, dais, stand, or any other platform or assembly comprising a plurality of emitters 102 and/or receivers 104. The emitter assemblies 802 and receiver assemblies 804 can be portable, such that they can be moved to desired positions around a playing surface 112. By way of non-limiting examples, in some embodiments the emitter assemblies 802 and receiver assemblies 804 can have rollers, wheels, sliders, or other components to assist in moving the emitter assemblies 802 and receiver assemblies 804. In other embodiments the emitter assemblies 802 and receiver assemblies 804 can be moved manually or with other equipment. In some embodiments, a controller 110 can be housed within an emitter assembly 802 or receiver assembly 804, while in other embodiments the controller 110 can be separate.

In these embodiments, the placement of the emitter assemblies 802 and receiver assemblies 804 can define target areas 700 on or over the playing surface 112. By way of a non-limiting example, placing one pair of emitter assemblies 802 and receiver assemblies 804 on opposing sides of the back of a tennis court and a second pair of emitter assemblies 802 and receiver assemblies 804 on the front and back of half the court can define a target area 700 in a back corner of the court at the location of intersecting beams 106 extending between the emitter assemblies 802 and receiver assemblies 804, as shown in FIG. 8. As such, a player, coach, or other user can physically move one or more emitter assemblies 802 and receiver assemblies 804 around the playing surface 112 to change the location of monitored target areas 700. Alternately, individual emitters 102 and/or receivers 104 can be physically moved around the playing surface 112 without being mounted on assemblies to set up or move target areas 700.

Figure 9:
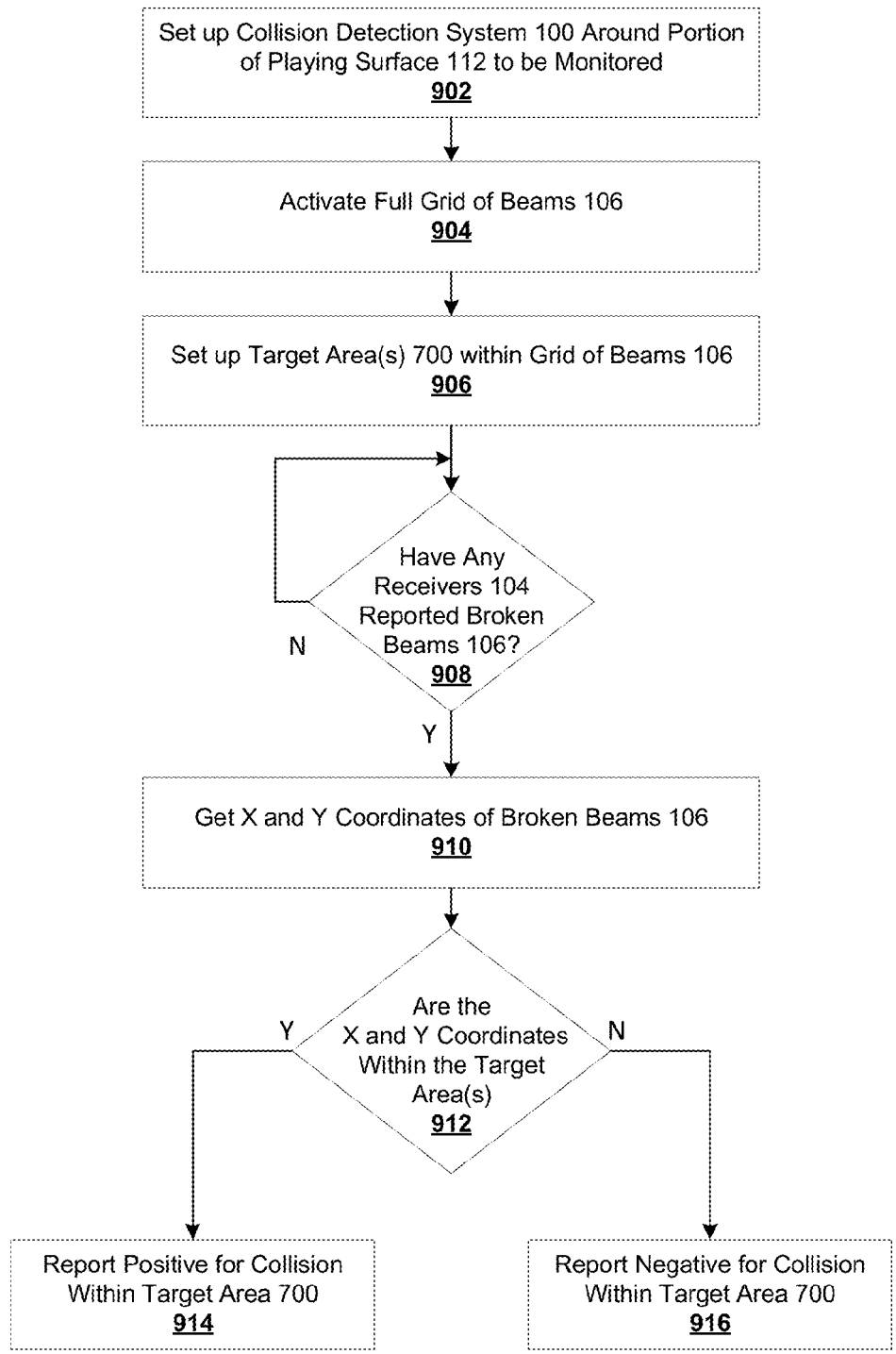
FIG. 9 depicts a flowchart for a first exemplary method of detecting collisions of objects within monitored target areas on a playing surface.

FIG. 9 depicts a flowchart for a first exemplary method of detecting collisions of objects 108 within monitored target areas 700 on a playing surface 112. At step 902, a collision detection system 100 can be set up around a desired portion of a playing surface 112, with sets of emitters 102 and receivers 104 set up around the monitored portion of the playing surface 112, such that the emitters 102 can form a grid of beams 106 across the monitored portion of the playing surface 112. As described above, the emitters and receivers 104 can be positioned such that the grid of beams 106 has a height above the playing surface 112 and a space between the beams 106 such that when a desired object 108 to be monitored, such as a ball with a known diameter, impacts the playing surface 112 or passes through the plane of the beams 106, the object 108 will break at least two intersecting beams 106 in the grid. At step 904, the controller 110 can activate the grid of beams 106 and the collision detection system 100 can begin to monitor the full grid beams 106 to determine if any have been broken.

At step 906, coordinates defining one or more targets areas 700 within the grid of beams 106 can be entered into the controller 110. By way of various non-limiting examples, a user can select one or more desired target areas 700 from a preset menu of possible target areas 700 that have had their coordinates pre-defined, a user can enter coordinates defining one or more target areas 700 manually, a user can draw or select target areas 700 visually on a display and the controller 110 can translate those drawings into coordinates, the controller 110 can be set to follow a user-entered or preset training program that rotates through, or randomly selects from, a series of possible pre-set target areas 700, and/or the controller 110 can set up or receive target areas 700 in any other desired manner.

At step 908, the controller 110 can check whether any beams 106 in the full grid expected by the receivers 104 have been broken. This step can repeat until an object 108 impacts the playing surface 112 or passes through the plane of the beams 106 and breaks intersecting beams 106.

At step 910, after beams 106 have been reported as broken by at least two receivers 104, the controller 110 can determine which receivers 104 reported the broken beams 106. Because the grid of beams 106 can be set up such that each beam represents an x or y coordinate, the controller 110 can determine an x coordinate based on which receiver 104 in a first set of receivers 104 failed to receive a beam 106, and can similarly determine a y coordinate based on which receiver 104 in a second set of receivers 104 failed to receive a beam 106.

At step 912, the controller 110 can compare the x and y coordinates of the object's impact with the coordinates defining the target areas 700. If the coordinates of the object's impact were within a target area 700, the controller 110 can report that the target area 700 was positively hit at step 914. If the coordinates of the object's impact were not within the target area 700, the controller 110 can report that the target area 700 was not hit at step 916.

Figure 10:
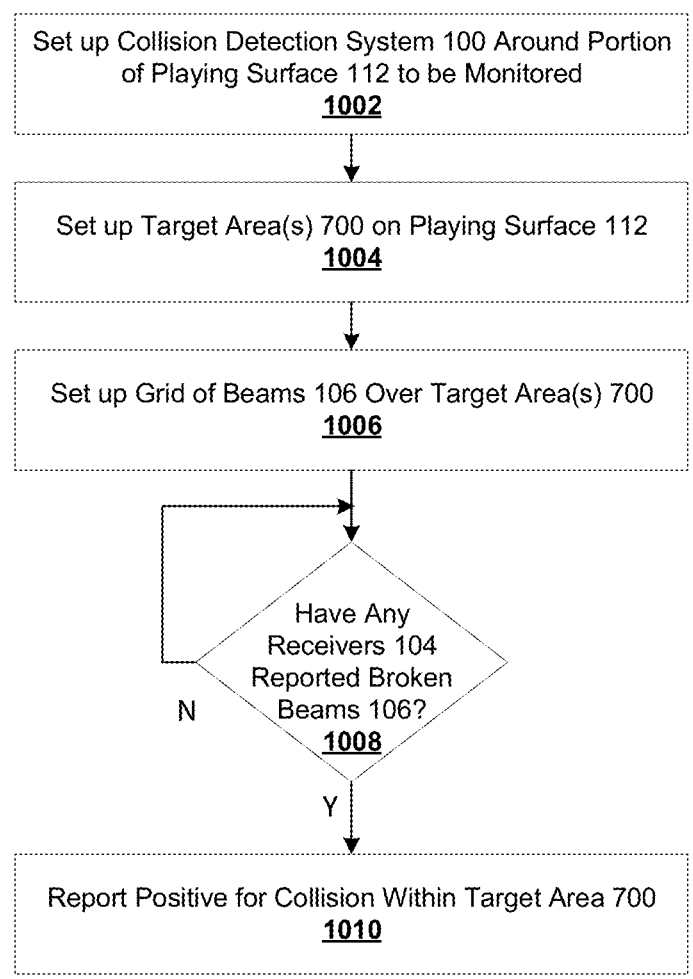
FIG. 10 depicts a flowchart for a second exemplary method of detecting collisions of objects within monitored target areas on a playing surface.

FIG. 10 depicts a flowchart for a second exemplary method of detecting collisions of objects 108 within monitored target areas 700 on a playing surface 112. At step 1002, a collision detection system 100 can be set up around a desired portion of a playing surface 112, with sets of emitters 102 and receivers 104 set up around the monitored portion of the playing surface 112, such that the emitters 102 can form a grid of beams 106 across the monitored portion of the playing surface 112. In some embodiments, emitters 102 and receivers can be set up individually, while in other embodiments emitter assemblies 802 and receiver assemblies 804 can be set up around the playing surface 112. As described above, the emitters and receivers 104 can be positioned such that the grid of beams 106 has a height above the playing surface 112 and a space between the beams 106 such that when a desired object 108 to be monitored, such as a ball with a known diameter, impacts the playing surface 112 or passes through the plane of the beams 106, the object 108 will break at least two intersecting beams 106 in the grid.

At step 1004, coordinates defining one or more targets areas 700 over the playing surface 112 can be entered into the controller 110. By way of various non-limiting examples, a user can select one or more desired target areas 700 from a preset menu of possible target areas 700 that have had their coordinates pre-defined, a user can enter coordinates defining one or more target areas 700 manually, a user can draw or select target areas 700 visually on a display and the controller 110 can translate those drawings into coordinates, the controller 110 can be set to follow a user-entered or preset training program that rotates through, or randomly selects from, a series of possible pre-set target areas 700, and/or the controller 110 can set up or receive target areas 700 in any other desired manner. In alternate embodiments step 1004 can be absent, such as when emitter assemblies 802 and receiver assemblies 804, or individual emitters 102 and receivers 104, are set up such that beams 106 only extend over and intersect within the desired target areas 700.

At step 1006, the controller 110 can activate beams 106 that extend over the selected target areas 700 and can begin to monitor the beams 106 to determine if any have been broken. In some embodiments, a subset of the beams 106 that intersect to cover the target areas 700 can be activated. In other embodiments, a full grid of beams 106 can be activated but only beams 106 that do form portions of target areas 700 can be actively monitored for collisions. In yet other embodiments in which the emitters 102 and receivers 104 were set up to only have beams 106 extending over the target areas 700, the beams 106 can be activated.

At step 1008, the controller 110 can check whether any activated or monitored beams 106 that form a target area 700 have been broken. This step can repeat until an object 108 impacts the playing surface 112 and breaks intersecting beams 106 within a target area 700.

At step 1010, after beams 106 within a target area 700 have been reported as broken by receivers 104, the controller 110 can report that the target area 700 was positively hit.

Figure 11A:
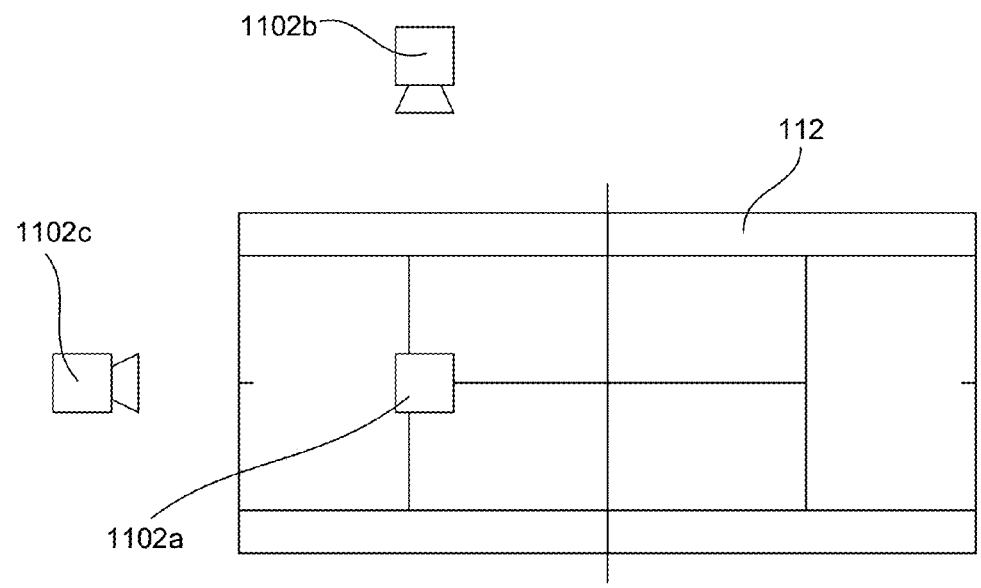
FIG. 11A depicts a top view of an alternate embodiment of a collision detection system set up around a half tennis court.
Figure 11B:
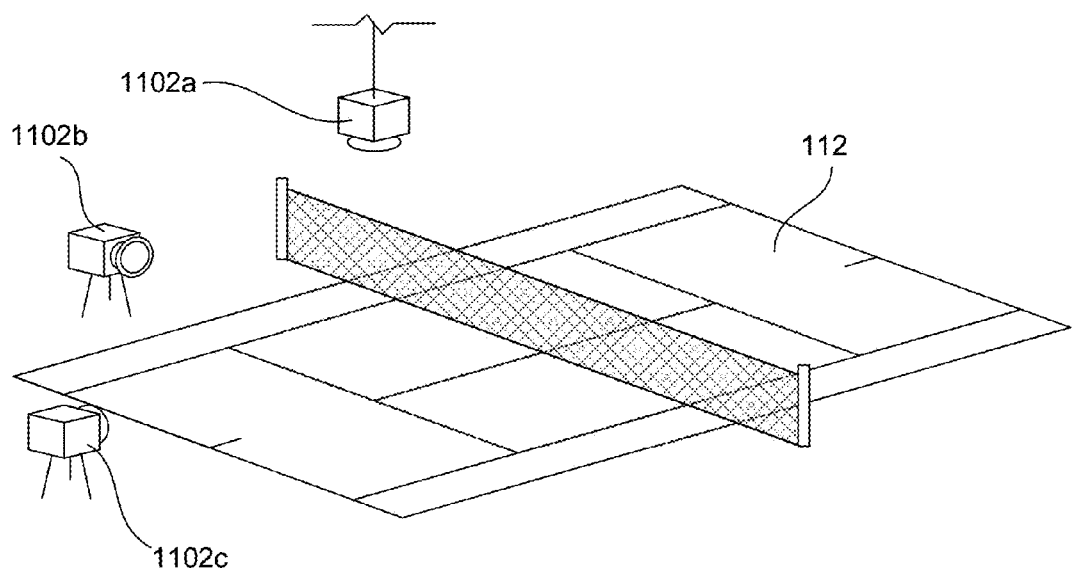
FIG. 11B depicts a perspective view of the collision detection system of FIG. 10B.

FIGS. 11A and 11B respectively depict top and perspective views of an alternate embodiment of a collision detection system 100. In this embodiment, the collision detection system 100 can comprise two or more cameras 1102 positioned around a playing surface 112. Each camera 1102 can be placed to capture a different view of the playing surface 112 and/or play area. By way of a non-limiting example, the collision detection system 100 shown in FIGS. 11A and 11B comprises three cameras 1102 installed around half a tennis court, with camera 1102a suspended above the tennis court, camera 1102b placed on the side of the tennis court, and camera 1102c placed behind the tennis court. In alternate embodiments cameras 1102 can be positioned at any other location around the playing surface 112, such as on the roof of an indoor court, on walls or fences of a practice court, arena, or stadium, or at any other desired location. The cameras 1102 can be in data communication with a controller 110 over a wired or wireless connection.

Each camera 1102 can be a video or high-speed camera configured to capture a series of successive frames, with each camera 1102 being synced to capture frames simultaneously. In each frame, the collision detection system 100 can be configured to determine the location of a particular object 108 within the frame. The controller 110 and/or each camera 1102 can use object recognition techniques in computer vision and/or machine vision to search the frame for a specific object 108 to be detected, such as a sport ball. By way of non-limiting examples, the controller 110 or camera 1102 can use edge detection to distinguish objects 108 and/or search for areas of the frame of the expected size, shape, and color of the object 108 to be detected. In some embodiments, the controller 110 or camera 1102 can track the position of an object 108 through multiple successive frames, such that position information from previous frames can be used to extrapolate likely positions of the object 108 in subsequent frames.

Figure 12A:
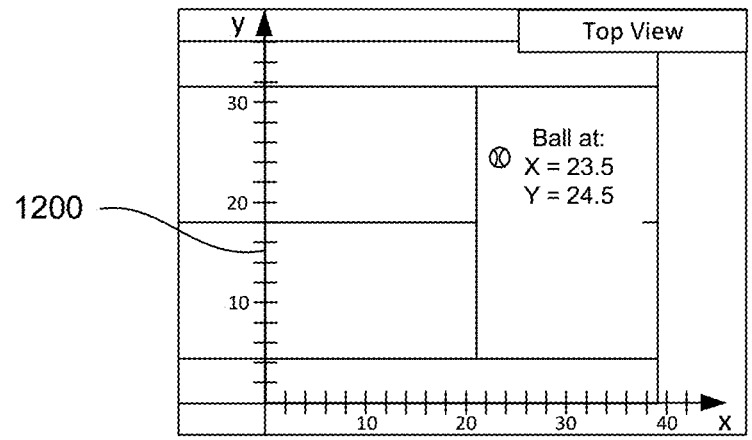
FIG. 12A depicts an example of a frame captured by a camera positioned above a half tennis court.
Figure 12B:
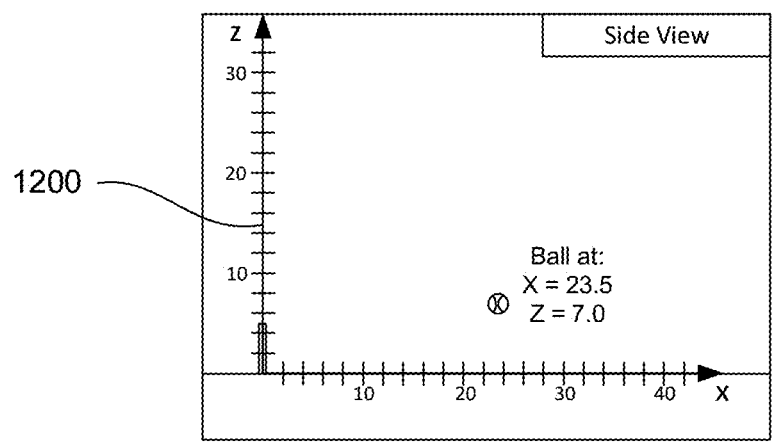
FIG. 12B depicts an example of a frame captured by a camera positioned on the side of a half tennis court.
Figure 12C:
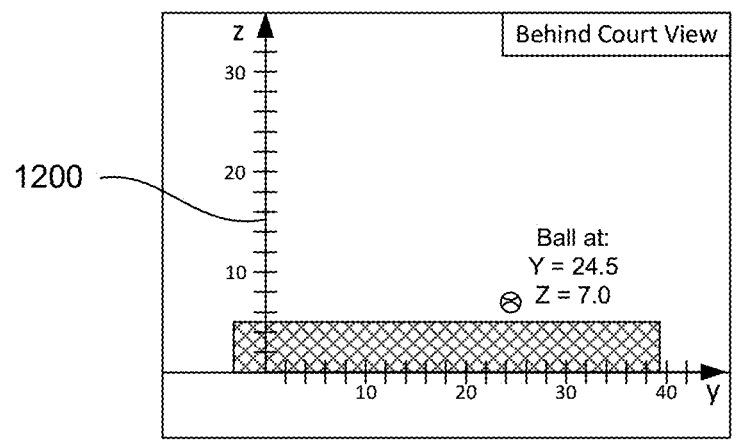
FIG. 12C depicts an example of a frame captured by a camera positioned behind a half tennis court.

The frames from each camera 1102 can be associated with at least one coordinate grid 1200, such that the location of the object 108 found within a frame can be described in terms of two-dimensional coordinates on the coordinate grid 1200 associated with the viewpoint of the camera 1102. In some embodiments, the coordinate grids 1200 can use a Cartesian coordinate system, with the playing surface 112 extending along an x-y plane and a height above the playing surface described as a z-coordinate. By way of a non-limiting example, in the camera placement shown in FIGS. 11A and 11B: the camera 1102a above the tennis court can be configured to capture frames from which the tennis ball's coordinates on an x-y coordinate grid 1200 can be found, as shown in FIG. 12A; the camera 1102b on the side of the tennis court can be configured to capture frames from which the tennis ball's coordinates on an x-z coordinate grid 1200 can be found, as shown in FIG. 12B; and the camera 1102c behind the tennis court can be configured to capture frames from which the tennis ball's coordinates on an y-z coordinate grid 1200 can be found, as shown in FIG. 12C.

In some embodiments each camera 1102 can have a static coordinate grid 1200 with which coordinates of an object 108 in the frame can be found. In other embodiments, one or more cameras 1102 can be associated with a plurality of coordinate grids 1200 or a movable coordinate grid 1200, and the camera 1102 or controller 110 can choose which one or which position to use.

Figure 13:
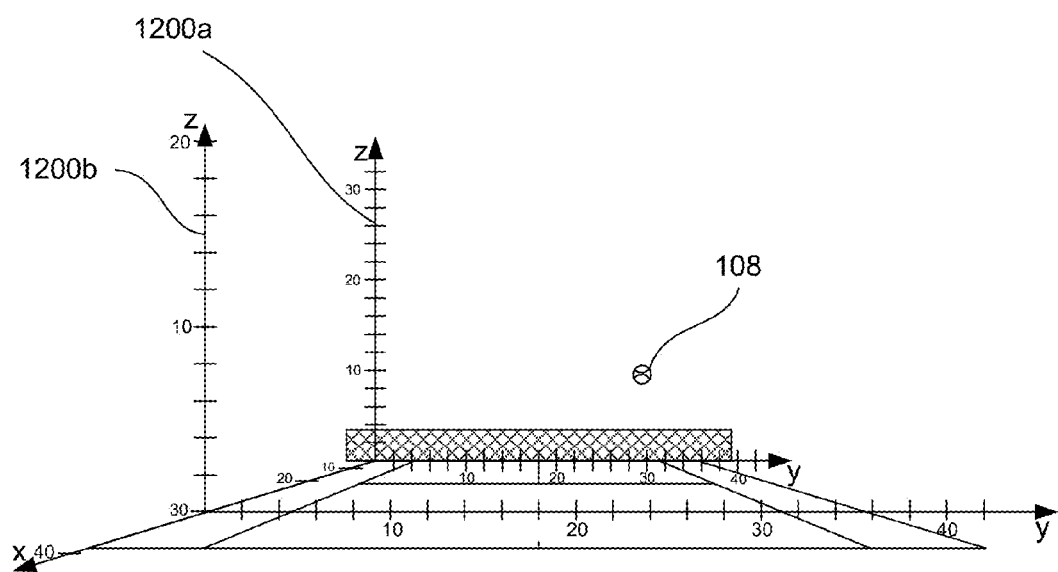
FIG. 13 depicts an example of multiple coordinate grids for a camera positioned behind a half tennis court.

By way of a non-limiting example, FIG. 13 depicts a frame taken by a camera 1102 behind a tennis court. Due to the camera's perspective, a ball or other object 108 could appear to be at different y-z coordinates depending on its depth relative to the camera 1102. As such, the camera 1102 and/or controller 110 can use information about the object's depth relative to the camera to determine which coordinate grid 1200 to use. By way of a non-limiting example, an above-the-court camera 1102 can capture the ball's location above the court on an x-y coordinate grid 1200, such that the collision detection system 100 knows the ball's x coordinate, thereby allowing the collision detection system 100 to position and size the y-z coordinate grid 1200 at the ball's depth. For instance, if the ball were found to be at a depth near the net, the coordinate grid 1200a could be used, while if the ball were found to be at a depth closer to the back of the court, the coordinate grid 1200b could be used.

By way of another non-limiting example, the ball's depth relative to the camera 1102 can be found by examining the object's size in the frame. For instance, because a ball has a fixed diameter and will appear larger when closer to the camera 1102, the collision detection system 100 can be preset to know that a ball that appears at a certain size in the two dimensional frame is at a certain distance away from the camera 1102, and that information can be used to select the appropriate coordinate grid 1200 for the object's depth.

After the two-dimensional coordinates have been found from two or more frames taken at the same time by different cameras 1102, the two-dimensional coordinates from each camera 1102 can be compared and/or combined to find the full three dimensional coordinates of the detected object 108 at the point in time at which the frames were taken. The collision detection system 100 can thus track the object's location in three dimensional space above the playing surface 112.

In alternate embodiments, the object's position in simultaneous frames from cameras 1102 at different locations around or above the playing surface 112 can be compared to triangulate or extrapolate the object's three dimensional location. By way of a non-limiting example, multiple cameras 1102 can be mounted on various positions on the roof of an indoor tennis court. In this example, a camera 1102 directly above the center court can assist in determining a ball's position on the plane of the court, while one or more additional cameras 1102 above the corners of the court or positioned away from the court can have a different perspective from which height information can be determined when comparing the ball's position in frames taken simultaneously by each camera 1102.

In some embodiments, the object's location in three dimensional space can be tracked continuously, and information about the ball's location at multiple points in time can be stored for use in tracking trajectories, speed, flight paths, and/or any other use. In other embodiments, the collision detection system 100 can use the object's three dimensional location to determine when the object 108 falls below a preset minimum height above the playing surface 112 and is thus likely to be contacting the playing surface 112. When the collision detection system 100 finds that the object is likely to be contacting the playing surface 112, it can record the object's location on the x-y plane of the playing surface 112, and that location information can be used to determine whether the object 108 impacted the playing surface 112 within a target area 700. In still other embodiments, target areas 700 can be set up in three dimensional space to track whether the object passed through an area above the playing surface 112. By way of a non-limiting example, target areas 700 can be set up as rings above a tennis court, such that the collision detection system 100 can track whether or not a player hit a tennis ball through the ring by following the ball's location in three dimensional space above the court.

Figure 14:
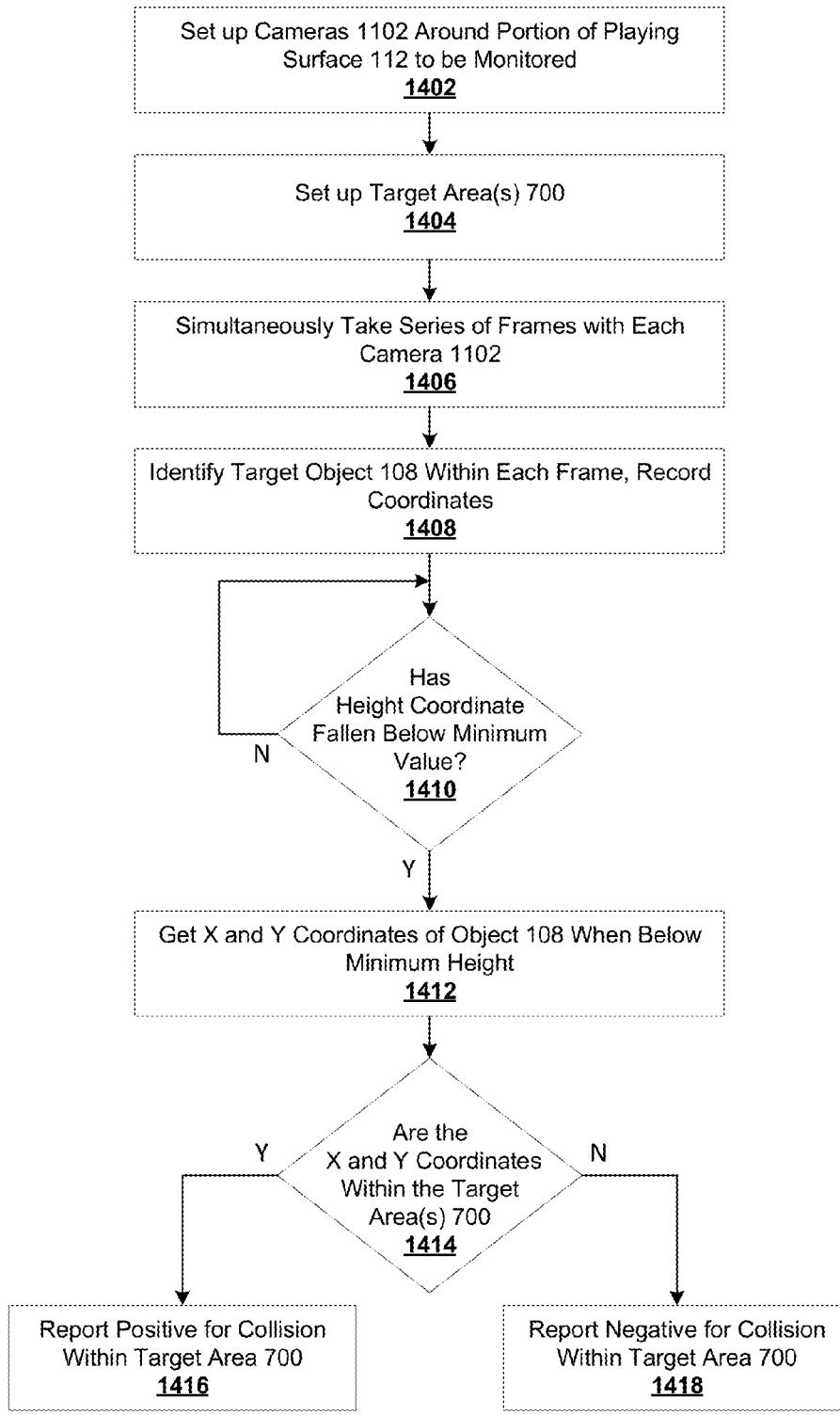
FIG. 14 depicts a flowchart for a third exemplary method of detecting collisions of objects within monitored target areas on a playing surface.

FIG. 14 depicts a flowchart for a third exemplary method of detecting collisions of objects 108 within monitored target areas 700 on a playing surface 112. At step 1402, a collision detection system 100 comprising at least two cameras 1102, such as the collision detection system 100 shown in FIGS. 11A-11B, can be set up around a desired portion of a playing surface 112. The cameras 1102 can each be set up to capture an object's location on or above the playing surface 112 along a different plane with a different coordinate grid 1200. As shown in FIGS. 12A-12C, in some embodiments one camera 1102 can be set up to capture position information in an x-y plane, another can be set up to capture position information in a y-z plane, and another on x-z plane. In other embodiments two cameras 1102 can be used, one to capture information on a horizontal plane and another on a vertical plane. By way of a non-limiting example, one camera 1102 can capture an object's coordinates on an x-y coordinate grid and the other camera 1102 can capture the object's coordinates on a y-z grid, such that the cameras 1102 together capture all of the object's x, y, and z coordinates so that the object's position in three dimensional space can be found.

At step 1404, coordinates defining one or more targets areas 700 on the playing surface 112 can be entered into the controller 110. By way of various non-limiting examples, a user can select one or more desired target areas 700 from a preset menu of possible target areas 700 that have had their coordinates pre-defined, a user can enter coordinates defining one or more target areas 700 manually, a user can draw or select target areas 700 visually on a display and the controller 110 can translate those drawings into coordinates, the controller 110 can be set to follow a user-entered or preset training program that rotates through, or randomly selects from, a series of possible pre-set target areas 700, and/or the controller 110 can set up or receive target areas 700 in any other desired manner. After the target areas 700 have been set, the collision detection system 100 can begin taking simultaneous pictures from all the cameras 1102 at step 1406.

At step 1408, the collision detection system 100 can examine each frame for the presence of a specific object 108. Prior to this step, the collision detection system 100 can be set to recognize a particular object 108, such as a specific type of sport ball. When the collision detection system 100 finds the object within a frame, it can compare the object's location in that frame against a coordinate grid 1100 and can record the coordinates. The two dimensional coordinates from each frame can be compared with two dimensional coordinates on one or more other planes from other cameras 1102 to find the full three dimensional coordinates of the object 108 above the playing surface 112. This step can be done for set of frames taken simultaneously by the different cameras 1102 to continuously track the object's location in three dimensional space.

At step 1410, the controller 110 can check whether the object is impacting the playing surface 112 by checking whether the object's position in three dimensional space has fallen below a preset minimum height. By way of a non-limiting example, when tracking a tennis ball with a 2.7 inch diameter, when the ball falls below 2.7 inches above the playing surface 112 the collision detection system 100 can determine that the ball has impacted the playing surface 112. This step can continue until the collision detection system 100 determines that the object 108 has impacted the playing surface 112, at which time it can move to step 1412.

At step 1412, the collision detection system 100 can find the coordinates on the plane of the playing surface 112 that correspond to the time that the object impacted the playing surface 112. By way of a non-limiting example, it the collision detection system 100 finds that an object 108 hit the playing surface 112 at time t, it can find the associated x and y coordinates of the object 108 at time t from the three dimensional positioning information it has been tracking with each successive set of frames.

At step 1414, the controller 110 can compare the x and y coordinates of the object's impact with the coordinates defining the target areas 700. If the coordinates of the object's impact were within a target area 700, the controller 110 can report that the target area 700 was positively hit at step 1416. If the coordinates of the object's impact were not within the target area 700, the controller 110 can report that the target area 700 was not hit at step 1418.

In use, a collision detection system 100 can detect a position on the playing surface 112 where a ball or other object 108 impacts the playing surface 112, using a method such as the ones described above with respect to FIGS. 9, 10, and 14. In some embodiments, the controller 110 can record the collision location in memory, and/or can compare the collision location with one or more preset target areas 700. In some embodiments, each target area 700 can be a portion of the playing surface 112, such that the collision detection system 100 can determine whether the object 108 hit the desired portion of the playing surface 112. In other embodiments the target area 700 can be the entire playing surface 112 that is considered in-bounds, such that the collision detection system 100 can determine whether the object 108 hit in-bounds or out-of-bounds.

In some embodiments, the collision detection system 100 can record information about the first impact of the object 108 against the playing surface 112 within a period of time, while information about subsequent impacts can be discarded or afforded less weight. By way of a non-limiting example, when practicing tennis a player or coach can be interested in where a ball initially hits the court and can be less interested in where the ball bounces or comes to rest after the initial hit. In alternate embodiments, all impacts can be tracked. In other embodiments the collision detection system 100 can be set up so that monitored target areas 700 are above the plane of the playing surface 112 at a height at which an object 108 passing through the target area 700 is likely to impact the playing surface 112 below the target area 700 but objects 108 resting on the playing surface 112 do not break the target area 700. By way of a non-limiting area, monitored target areas 700 can be on a plane higher than the height of a tennis ball, such that tennis balls passing through the plane of the target areas 700 are detected while tennis balls resting or rolling on the playing surface 112 below are not detected. In alternate embodiments and/or situations, a human can shag balls to retrieve them off the court such that the presence of a previous ball on the playing surface 112 is not detected as a new collision with the playing surface 112.

In some embodiments, the controller 110 can keep a running tally of how many times each target area 700 was and/or was not hit. In some embodiments, the running tally can be displayed on a scoreboard, be printed out on a scorecard, be stored in a data file, be transmitted to an application on a user's mobile device, or be used in any other desired manner. In some embodiments, the controller 110 can alternatively or additionally trigger audio or visual feedback when a target area 700 is successfully hit or is missed, such as triggering an audio sound, turning on a green or red light, or updating a scoreboard display.

In some embodiments in which multiple target areas 700 were being monitored, the controller can alternately or additionally keep track of which target areas 700 were hit. In these embodiments, the controller 110 can take different actions depending on which target areas 700 were hit, such as awarding players different point values for hitting different target areas 700, displaying different scoreboard messages for hitting different target areas 700, or triggering different audio or visual cues for hitting different target areas 700.

When practicing a game like tennis, players and/or coaches can set up the collision detection system 100 to detect whether or not a tennis ball was hit one or more specified target areas 700 areas on the tennis court. This information can be used to confirm whether a player is accurately hitting the ball into the desired area when practicing a certain type of shot or game scenario. Alternately, the collision information can be used to play a game in which different point values are given for hitting the ball to different areas of the court, or in which different players take turns trying to hit target areas or achieve high scores in certain types of drills.

Figure 15:
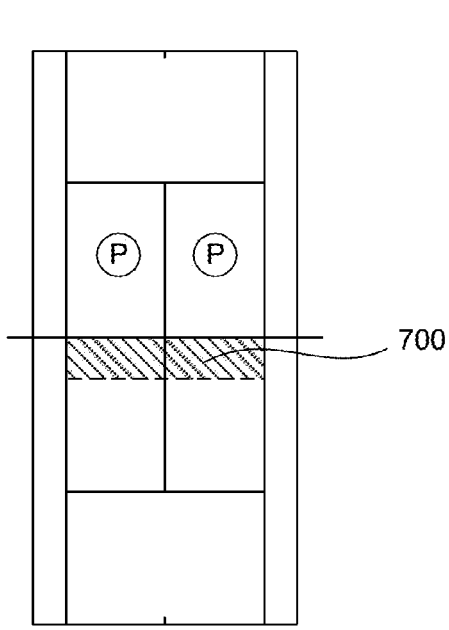
FIG. 15 depicts a first example of a target area set up on a tennis court.

By way of a non-limiting example, when practicing or teaching a drop shot, drop volley, or sharply hit angle volley in which the goal is to hit the tennis ball just over the net, the collision detection system 100 can be set up to detect whether the ball was successfully hit into a rectangular target area 700 just in front of the net, as shown in FIG. 14. FIG. 15 depicts a similar non-limiting example in which the target area 700 is set as a rectangular area at the end of the court. Hitting a ball into the target area 700 shown in FIG. 15 can be desired when practicing or teaching hitting the ball deep with groundstrokes, volleys, lobs, overhands, and/or forehand or backhand approach shots.

Figure 16:
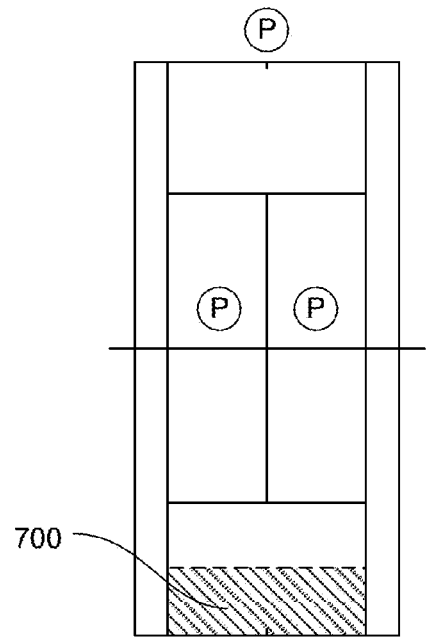
FIG. 16 depicts a second example of a target area set up on a tennis court.
Figure 17:
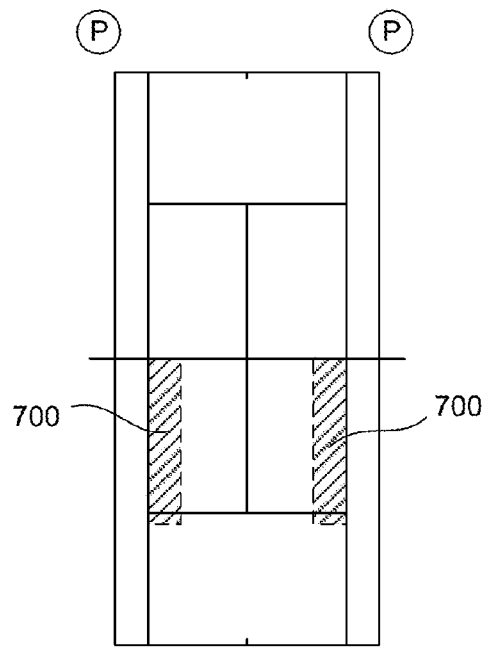
FIG. 17 depicts a first example of non-contiguous target areas set up on a tennis court.

The collision detection system 100 can be set up to detect collisions with the playing surface 112 at non-contiguous locations. By way of a non-limiting example, FIG. 16 shows that the collision detection system 100 can be set up to detect that a tennis ball hit either of two target areas 700 extending along a side of the tennis court from the net to just beyond the service line. Hitting a tennis ball into the target areas 700 shown in FIG. 16 can be desired when practicing or teaching serves or cross-court shots to attempt to draw an opponent to one side of the court so that the opponent leaves the other side of the court open. Similarly, FIG. 17 depicts a non-limiting example in which the collision detection system 100 is set up to monitor targets areas 700 formed as columns fully extending along the sides of the tennis court. Detecting ball impacts within the target areas 700 shown in FIG. 17 can be desired when practicing or teaching hitting the ball straight ahead for down-the-line passing shots, volleys, or groundstrokes.

The collision detection system 100 can also be set up to detect collisions with intersecting target areas 700. In some embodiments the collision detection system can report that the ball hit within any of the target areas 700, and award bonus points or otherwise recognize collisions within the intersections of the target areas 700. In other embodiments the collision detection system 100 can be set up to only detect or report collisions within the intersections of the target areas 700.

Figure 18:
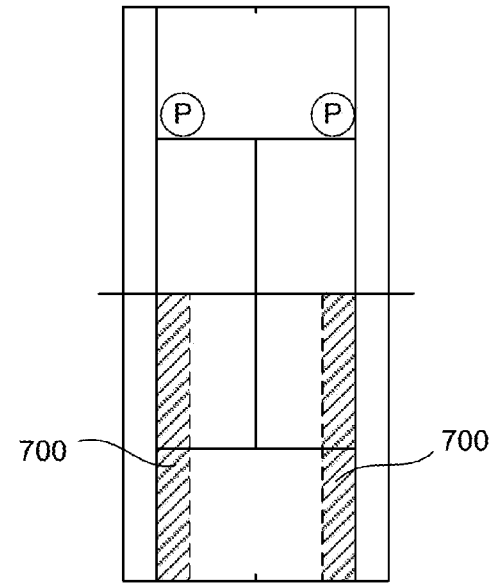
FIG. 18 depicts a second example of non-contiguous target areas set up on a tennis court.

FIG. 18 depicts a non-limiting example in which the collision detection system 100 is set up to monitor intersecting target areas 700 on a tennis court. In this example, the collision detection system 100 can be set up to monitor a row extending across the court in front of the service line, as well as two columns extending from the net to the back of the court on either side of each service box. If the ball hits within an intersection of these target areas 700, the collision detection system 100 can confirm that the ball hit the corner of the service box, which can be desired when practicing or teaching serves.

Figure 19:
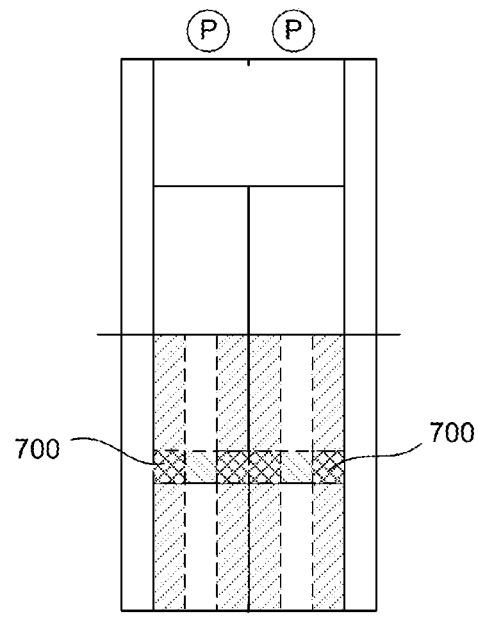
FIG. 19 depicts a first example of intersecting target areas set up on a tennis court.
Figure 20:
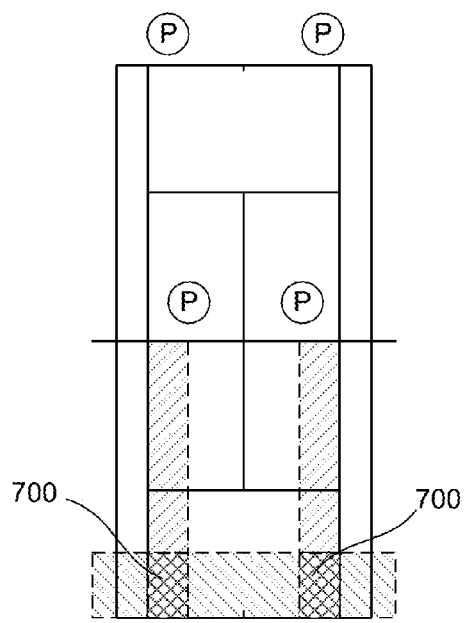
FIG. 20 depicts a second example of intersecting target areas set up on a tennis court.

FIGS. 19 and 20 depicts similar non-limiting examples, in which the collision detection system 100 is set up to monitor intersecting target areas 700 on a tennis court, with the target areas being at the intersection of a row proximate to the baseline and columns extending along the sides of the court. FIG. 19 depicts a row and two columns that place the intersecting target areas 700 proximate to the corners of the tennis court near the baseline. These target areas 700 can be desired when practicing hitting groundstrokes, volleys, lobs, and overhands. FIG. 20 depicts a similar arrangement of a row and two columns, but has a wider row and wider columns to form larger intersecting target areas 700 for beginning or intermediate players to practice hitting balls near the corners.

Figure 21:
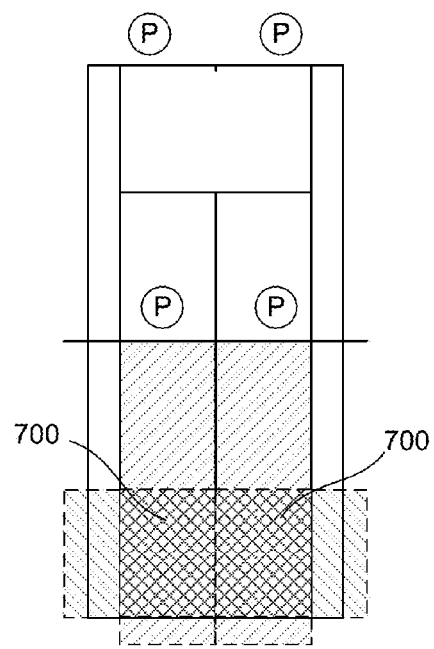
FIG. 21 depicts a third example of intersecting target areas set up on a tennis court.
Figure 22:
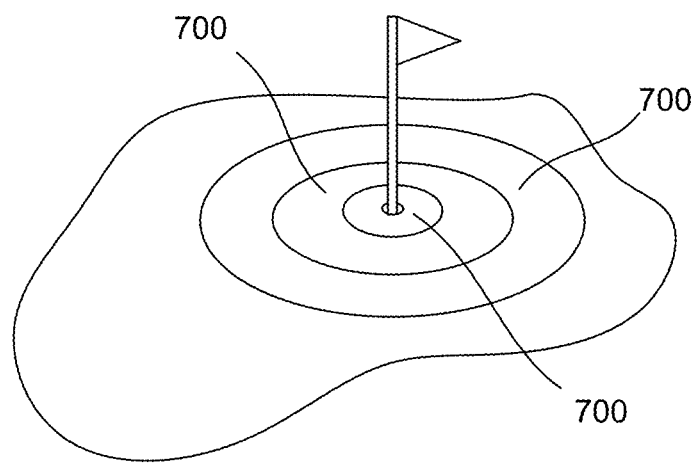
FIG. 22 depicts an of target areas set up on a golf practice green.
Figure 23:
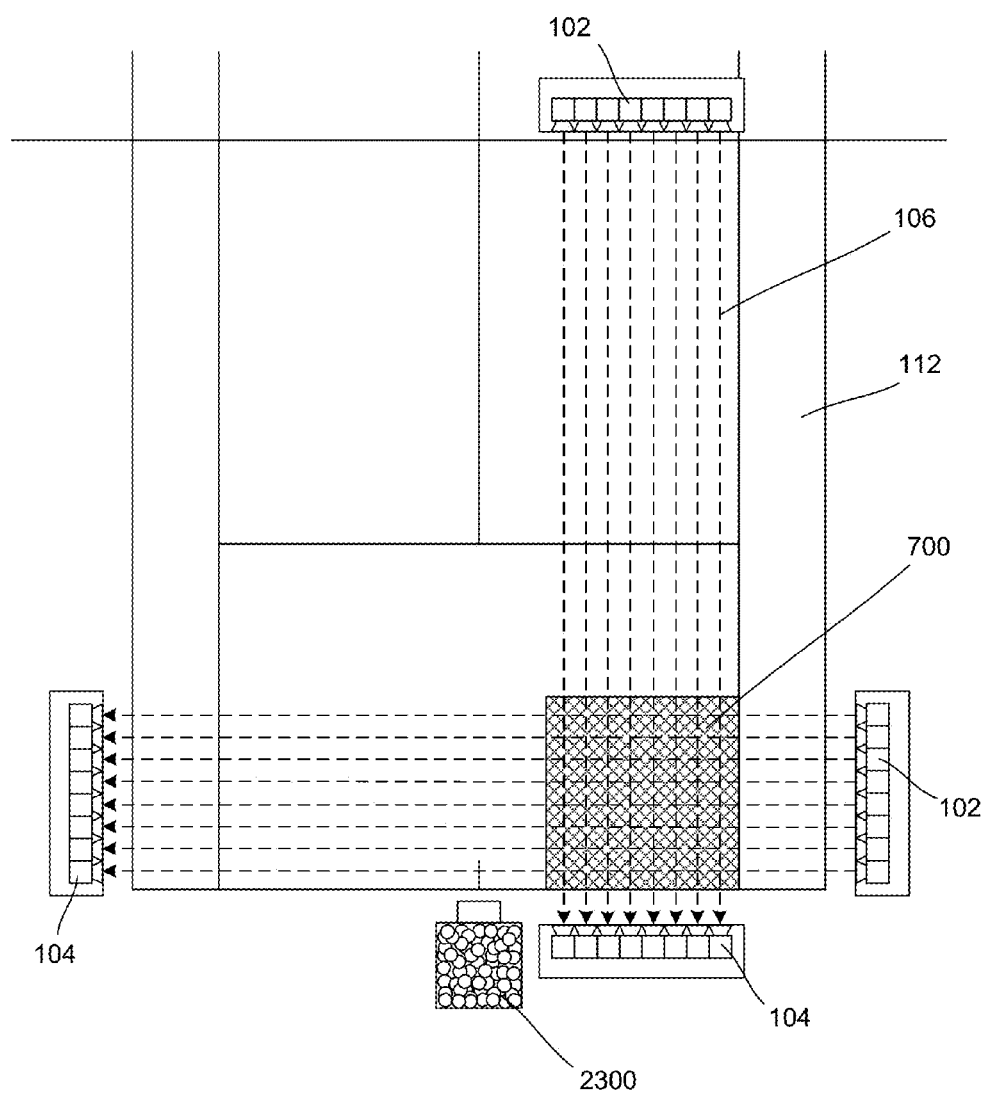
FIG. 23 depicts an alternate embodiment of the system shown in FIG. 4A thru FIG. 7.

FIG. 21 depicts a non-limiting example in which the collision detection system 100 can assign points depending on where the ball or object 108 hits the playing surface 112. FIG. 21 depicts a golf practice green at which the collision detection system 100 can be set up to detect the impact or final location of a golf ball within different target areas 700. For instance, as a non-limiting example, the collision detection system 100 can give one point for hitting a ball on the green, three points for hitting the ball within the outer ring, five points for hitting the ball within the middle ring, and 10 points for hitting the ball within the inner ring closest to the pin.

In some embodiments, the collision detection system 100 can further comprise a ball machine 2300. The ball machine 2300 can be an automatic or manual machine configured to serve, pitch, throw, feed, or otherwise project a ball or other object 108 over the playing surface 112. By way of a non-limiting example, the ball machine 2300 can be a tennis ball machine configured to eject tennis balls at a desired speed and/or angle to simulate a particular type of shot such as a lob, volley, or serve. In some embodiments and/or situations, the ball machine 2300 can serve a tennis ball towards a player on one half of the court, and the player can thus practice hitting the ball into a monitored target area on other half of the court. In alternate embodiments the ball machine 2300 can be absent, and a human partner can throw or hit balls towards a practicing player who attempts to hit the balls into target areas 700, or a player can throw a ball into the air and attempt to hit it into a target area 700.

In some embodiments the ball machine 2300 can be in communication with the controller 110 and/or a player or coach's mobile device, such that the ball machine 2300 can be instructed on which type of shot to simulate. By way of a non-limiting example, the ball machine 2300 can be in communication with a player's device, such as a mobile phone or tablet computer, through a wireless data connection to receive instructions from the player's device on the type of shot to simulate. By way of another non-limiting example, a user can enter instructions for the ball machine 2300 when entering the locations of target areas 700 into the controller 110.

In some embodiments, communication between the ball machine 2300 and the rest of the collision detection system 100 can allow the collision detection system 100 to automatically adjust settings based on the current target areas 700, type of shot the player desires to practice, the player's performance, and/or any other criteria. By way of various non-limiting examples, the collision detection system 100 can be set up to shoot balls towards a player until a target area 700 has been hit a preset number of times, shoot a new ball after the previously served ball has been returned and is detected as having hit the playing surface 112, simulate different types of shots to be returned into the same or different target areas 700, adjust the speed and/or trajectory of balls shot by the ball machine 2300 depending on how accurate a player has been in hitting the target areas 700, or adjust the target areas 700 and/or any other setting of the ball machine 2300.

In some embodiments, the controller 110 and/or audiovisual components connected to the controller 110 can be connected to, or housed within, the ball machine 2300. By way of a non-limiting example, the ball machine 2300 can have a display on which score information or other feedback is displayed when the collision detection system 100 determines that a target area 700 has been hit.

In some embodiments, the ball machine 2300 can be a part of, or be connected to, one or more emitter assemblies 802 and/or receiver assemblies 804, or one or more individual emitters 102 and/or receivers 104. By way of a non-limiting example, the ball machine 2300 can be moved around the court with, or in conjunction with, a mobile emitter assembly 802 or receiver assembly 804.

In some embodiments, one or more cameras 1102 can be coupled with or housed within the ball machine 2300. By way of a non-limiting example, the ball machine 2300 can be have a camera 1102 and can be placed behind the court such that the camera 1102 has a behind-the-court viewpoint similar to FIG. 13. In embodiments in which one or more cameras 1102 are in communication with the ball machine 2300, data from the cameras 1102 can be used to adjust the ball machine's settings. By way of various non-limiting examples, the camera data can be used by the ball machine 2300 and/or controller 110 to wait to shoot a new ball until a player has returned the previous ball, adjust the speed and/or trajectory of balls depending on a player's performance in hitting target areas 700, or any other adjustment.

Although the invention has been described in conjunction with specific embodiments thereof, it is evident that many alternatives, modifications and variations will be apparent to those skilled in the art. Accordingly, the invention as described and hereinafter claimed is intended to embrace all such alternatives, modifications and variations that fall within the spirit and broad scope of the appended claims.

What is claimed is:

1. A collision detection system, comprising:
 a first set of emitters and receivers positioned around a portion of a playing surface such that each emitter in said first set emits a beam of light over said playing surface to a corresponding receiver in said first set;

a second set of emitters and receivers positioned around said portion of said playing surface such that each emitter in said second set emits a beam of light over said playing surface to a corresponding receiver in said second set; and a controller in data communication with said first set of emitters and receivers and said second set of emitters and receivers, wherein the beams extending between the emitters and receivers of said first set are substantially orthogonal to the beams extending between the emitters and receivers of said second set, such that the beams form a grid of beams over said portion of said playing surface defining a Cartesian plane with the intersection points of said substantially orthogonal beams corresponding to sets of ordered pairs having an x-value and a y-value, wherein said receivers in said first set and said second set are configured to inform said controller when said receivers fail to receive a beam, and wherein, when at least one of the receivers in the first set and at least one of the receivers in the second set simultaneously inform said controller that they have failed to receive a beam, said controller is configured to use said x-value and y-value corresponding to the intersection of said beams to indicate the location of an object that impacted the playing surface.

2. The collision detection system of claim 1, wherein each emitter in said first set and said second set are infrared emitters and each receiver in said first set and said second set are infrared detectors, such that each of said beams are beams of infrared light.

3. The collision detection system of claim 1, wherein said controller is loaded with coordinates defining one or more target areas, and the controller is configured to determine whether a detected object impacted said playing surface within said one or more target areas.

4. The collision detection system of claim 1, wherein said grid of beams is positioned at a height above said playing surface at which said object will break one or more beams when said object impacts said playing surface.

5. The collision detection system of claim 1, wherein said grid of beams is spaced with a width between adjacent beams such that said object will break at least one pair of orthogonal beams when passing through said grid of beams.

6. A method of tracking object collisions against a playing surface, comprising:

forming a grid of substantially orthogonal beams of light over a playing surface by setting up pairs of emitters and receivers around said playing surface, said grid being positioned at a height above said playing surface below a maximum height of a target object resting against said playing surface and defining a Cartesian plane with the intersection points of said substantially orthogonal beams corresponding to sets of ordered pairs having an x-value and a y-value;

providing a controller in data communication with said receivers, wherein each of said receivers is associated with a coordinate on said grid;

determining with said controller that said target object has impacted said playing surface by receiving information from two substantially orthogonal receivers that said two substantially orthogonal receivers have failed to receive a beam at the same point in time; and recording, with said controller, the x- and y-coordinates associated with the intersection of said two substantially orthogonal receivers to determine the location of said target object's impact with said playing surface.

7. The method of claim 6, wherein each of said emitters is an infrared emitter and each of said receivers is an infrared detector, such that each of said beams are beams of infrared light.

8. The method of claim 6, further comprising receiving, at said controller, coordinates defining one or more target areas on said playing surface.

9. The method of claim 8, further comprising determining, with said controller, whether the coordinates of said target object's impact with said playing surface are within one of said one or more target areas.

10. The method of claim 9, further comprising updating a score in memory at said controller when the coordinates of said target object's impact with said playing surface are within one of said one or more target areas.

11. The method of claim 9, further comprising informing a user from said controller when the coordinates of said target object's impact with said playing surface are within one of said one or more target areas.

12. A method of tracking object collisions against a playing surface, comprising:

forming a grid of substantially orthogonal beams of light over a playing surface by setting up pairs of emitters and receivers around said playing surface, said grid being positioned at a height above said playing surface below a maximum height of a target object resting against said playing surface and defining a Cartesian plane with the intersection points of said substantially orthogonal beams corresponding to sets of ordered pairs having an x-value and a y-value;

providing a controller in data communication with said receivers, wherein each of said receivers is associated with a coordinate on said grid;

receiving, at said controller, x- and y-coordinates defining one or more target areas on said playing surface;

monitoring with said controller a subset of said receivers that receive a subset of substantially orthogonal beams that intersect over said one or more target areas; and determining with said controller that said target object has impacted said playing surface within one of said one or more targets areas by receiving information from two substantially orthogonal receivers within said subset of receivers that said two substantially orthogonal receivers have failed to receive a beam at the same point in time.

13. The method of claim 12, wherein each of said emitters is an infrared emitter and each of said receivers is an infrared detector, such that each of said beams are beams of infrared light.

14. The method of claim 12, further comprising recording, with said controller, the coordinates associated with said two orthogonal receivers to determine the coordinates of said target object's impact with said playing surface within said one or more target areas.

15. The method of claim 12, further comprising updating a score in memory at said controller when said controller determines that said target object has impacted said playing surface within one of said one or more target areas.

16. The method of claim 12, further comprising informing a user from said controller said controller determines that said target object has impacted said playing surface within one of said one or more target areas.

* * * * *